US006469434B1

(12) United States Patent
Bechtel et al.

(10) Patent No.: US 6,469,434 B1
(45) Date of Patent: Oct. 22, 2002

(54) ZINC SILICATE LUMINESCENT MATERIALS AND RELATED LUMINESCENT SCREEN PRODUCTS

(75) Inventors: Helmut Bechtel, Roetgen; Thomas Jüstel, Aachen; Walter Mayr, Würselen; Hans Nikol; Cornelis R. Ronda, both of Aachen, all of (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/437,479

(22) Filed: Nov. 10, 1999

(30) Foreign Application Priority Data

Nov. 18, 1998 (EP) .............................. 98203880

(51) Int. Cl.⁷ .............................. H01J 1/62; H01J 63/04
(52) U.S. Cl. ........................ 313/486; 313/485; 313/486; 313/487; 313/582; 252/301.6 F
(58) Field of Search .................. 252/301.6 F; 313/487, 313/485, 486, 582

(56) References Cited

U.S. PATENT DOCUMENTS

| | | | | |
|---|---|---|---|---|
| 4,208,448 A | * | 6/1980 | Panaccione .................. 427/67 |
| 4,539,506 A | * | 9/1985 | Ohtani et al. ................ 313/467 |
| 4,806,822 A | * | 2/1989 | Takahara et al. ............. 313/467 |
| 4,806,882 A | * | 2/1989 | Takahara et al. ............. 313/467 |
| 5,041,758 A | | 8/1991 | Huiskes et al. .............. 313/487 |
| 5,182,489 A | * | 1/1993 | Sano .......................... 313/485 |
| 5,788,881 A | * | 8/1998 | Cahdha et al. ......... 252/301.4 R |
| 5,825,125 A | * | 10/1998 | Ligthart et al. .............. 313/485 |
| 5,985,173 A | * | 11/1999 | Gray et al. ........... 252/301.4 R |
| 6,039,894 A | * | 3/2000 | Sanjurjo et al. ...... 252/301.4 R |
| 6,093,346 A | * | 7/2000 | Xiao et al. ............ 252/301.4 F |
| 6,123,872 A | * | 9/2000 | Yamazaki et al. .... 252/301.6 R |
| 6,180,029 B1 | * | 1/2001 | Hampden-Smith et al. ...... 252/301.4 R |
| 6,197,218 B1 | * | 3/2001 | Hampden-Smith et al. ...... 252/301.4 R |

* cited by examiner

Primary Examiner—Michael H. Day
Assistant Examiner—Glenn Zimmerman
(74) Attorney, Agent, or Firm—Frank Keegan

(57) ABSTRACT

Willemite ($Zn_2SiO_4$:Mn) is doped with one or more ions selected from the group formed by $Gd^{3+}$, $Eu^{2+}$, $Co^{2+}$, $Ce^{3+}$, $Pr^{3+}$, $Nd^{3+}$, $Sm^{3+}$, $Tb^{3+}$, $Dy^{3+}$, $Ho^{3+}$, $Er^{3+}$, $Tm^{3+}$ and $Yb^{3+}$. This results in a increase in absorption and quantum yield and a decrease of the decay time.

18 Claims, No Drawings

ZINC SILICATE LUMINESCENT MATERIALS AND RELATED LUMINESCENT SCREEN PRODUCTS

BACKGROUND OF THE INVENTION

The invention relates to a luminescent material comprising zinc silicate activated with $Mn^{2+}$. The invention also relates to a luminescent screen, a plasma panel display and a discharge lamp.

A luminescent material comprising zinc silicate activated with $Mn^{2+}$ is known for instance from EP 0393754, to which U.S. Pat. No. 5,041,758 corresponds. Such a luminescent material is widely used in fluorescent lamps and in plasma display panels to convert exciting radiation into visible green light. In fluorescent lamps the luminescent material is mainly excited by radiation with a wavelength of 254 nm, whereas in plasma display panels the excitation takes place under the influence of VUV radiation (10 nm–200 nm). Although the efficiency of the conversion depends on the wavelength of the exciting radiation, it can be concluded that in both applications the overall efficiency of the conversion of the exciting radiation into visible green light is relatively poor. Furthermore the decay time of the luminescent material is too long for displaying e.g. motion pictures on a plasma display panel.

SUMMARY OF THE INVENTION

The invention aims to provide a luminescent material comprising zinc silicate activated with $Mn^{2+}$, that converts exciting radiation within a wide range of wavelengths relatively efficiently into visible green light and has a relatively short decay time under VUV excitation.

In accordance with the invention, zinc silicate is doped with one or more dopant ions chosen from the group formed by $Gd^{3+}$, $Eu^{2+}$, $Co^{2+}$, $Ce^{3+}$, $Pr^{3+}$, $Nd^{3+}$, $Sm^{3+}$, $Tb^{3+}$, $Dy^{3+}$, $Ho^{3+}$, $Er^{3+}$, $Tm^{3+}$, and $Yb^{3+}$.

It has been found that a luminescent material according to the invention has a relatively high absorption for exciting radiation within a wide range of wavelengths. Furthermore the quantum yield of luminescent materials is also relatively high. As a result, luminescent materials according to the invention show a relatively high overall efficiency of the conversion of exciting radiation into visible green light for exciting radiation within a wide range of wavelengths. It has further been found that a luminescent material according to the invention has a relatively short decay time under VUV excitation.

In case the zinc silicate is doped with a trivalent ion, the luminescent material preferably further comprises one or more ions chosen from the group formed by $Li^{1+}$, $Na^{1+}$ and $K^{1+}$. By choosing the amount of monovalent ions substantially equal to the amount of trivalent ions, it is realized that the luminescent material has no net electrical charge.

Good results have been found for luminescent materials wherein between 0.1% and 15% of the $Zn^{2+}$ ions of zinc silicate have been replaced by $Mn^{2+}$ ions.

Similarly good results have been obtained for luminescent materials wherein between 0.05% and 5% of the $Zn^{2+}$ ions of zinc silicate have been replaced by dopant ions.

Because of the properties described hereabove, a luminescent material according to the invention is very suitable to be used in a luminescent screen that is part of a plasma display panel or of a discharge lamp. More in particular, good results have been obtained for discharge lamps comprising a gastight lamp vessel containing mercury and gas.

DETAILED DESCRIPTION OF THE PREFERRED EMBODIMENTS

ZnO, $SiO_2$, Mn-acetate.$4H_2O$, $GdCl_3.6H_2O$ and LiF (acting both as a charge compensator and as flux) are dispersed/dissolved in water using ultrasound waves. The suspension is then evaporated to dryness. The resulting mixture is then fired in a crucible at a temperature of 1200 C. under an atmosphere of 99% nitrogen mixed with 1% hydrogen. The temperature is first increased to 1200 C. with a rate of 4 C./minute, then maintained at 1200 C. for two hours and subsequently decreased to ambient temperature with a rate of 4 C./minute. The resulting luminescent material had a gadolinium content equal to 0.7 mol % and a manganese content equal to 11 mol %. Upon excitation with 254 nm radiation a quantum yield of 83% and an absorption of 94% was measured. Under identical conditions, in case of a luminescent material comprising no dopant ions but only 11 mol % of manganese (P1G1S manufactured by Kasei) the quantum yield was measured at 80% while the absorption was 95%.

The doped luminescent material and the luminescent material comprising no dopant were, also excited by means of a Ne/Xe plasma. The absorption was 95% and the quantum efficiency approximately 80%. Under these conditions the relative light output is defined as the ratio of the luminescent material emission integral and the Ne plasma line integral, the latter acting as an internal reference. The relative light output of the luminescent material containing no dopant was measured at 17.9, while the relative light output of the doped luminescent material was substantially higher at 29.9. When the luminescent materials were excited by excitation pulses having a pulse length of 0.5 msec., the decay time (defined as the time after which 90% of the excited manganese ions has relaxated) was measured at 9.9 msec. for the luminescent material comprising no dopant and 5.9 msec. for the doped luminescent material. When the luminescent materials were excited by excitation pulses having a pulse length of 20 msec., the decay times were respectively measured at 14.5 msec. and 8.0 msec. It can be concluded that the luminescent material according to the invention converts the exciting radiation into visible green radiation with a relatively high efficiency and also that the decay time of a luminescent material according to the invention is relatively short.

What is claimed is:

1. Luminescent material consisting essentially of zinc silicate activated with $Mn^{2+}$, wherein the zinc silicate is doped with one or more dopant ions chosen from the group formed by $Gd^{3+}$, $Eu^{2+}$, $Co^{2+}$, $Ce^{3+}$, $Pr^{3+}$, $Nd^{3+}$, $Sm^{3+}$, $Tb^{3+}$, $Dy^{3+}$, $Ho^{3+}$, $Er^{3+}$, $Tm^{3+}$ and $Yb^{3+}$.

2. Luminescent material according to claim 1 wherein between 0.1% and 15% of the $Zn^{2+}$ ions of the zinc silicate have been replaced by the $Mn^{2+}$ ions.

3. Luminescent material according to claim 1 wherein between 0.05% and 5% of the $Zn^{2+}$ ions of the zinc silicate have been replaced by one or more of said dopant ions.

4. Luminescent material comprising zinc silicate activated with $Mn^{2+}$, characterized in that the zinc silicate is doped with one or more dopant ions chosen from the group formed by $Gd^{3+}$, $Eu^{2+}$, $Co^{2+}$, $Ce^{3+}$, $Pr^{3+}$, $Nd^{3+}$, $Sm^{3+}$, $Tb^{3+}$, $Dy^{3+}$, $Ho^{3+}$, $Er^{3+}$, $Tm^{3+}$ and $Yb^{3+}$, wherein the zinc silicate is doped with a trivalent ion and further comprises one or more ions chosen from the group formed by $Li^{1+}$, $Na^{1+}$ and $K^{1+}$.

5. Luminescent material according to claim 4 wherein between 0.1% and 15% of the $Zn^{2+}$ ions of the zinc silicate have been replaced by the $Mn^{2+}$ ions.

6. Luminescent material according to claim 4, wherein between 0.05% and 5% of the $Zn^{2+}$ ions of the zinc silicate have been replaced by dopant ions.

7. Luminescent screen comprising a luminescent material comprising zinc silicate activated with $Mn^{2+}$, characterized in that the zinc silicate is doped with one or more dopant ions chosen from the group formed by $Gd^{3+}$, $Eu^{2+}$, $Co^{2+}$, $Ce^{3+}$, $Pr^{3+}$, $Nd^{3+}$, $Sm^{3+}$, $Tb^{3+}$, $Dy^{3+}$, $Ho^{3+}$, $Er^{3+}$, $Tm^{3+}$ and $Yb^{3+}$, wherein the zinc silicate is doped with a trivalent ion and further comprises one or more ions chosen from the group formed by $Li^{1+}$, $Na^{1+}$ and $K^{1+}$.

8. Plasma display panel comprising a luminescent screen as claimed in claim 7.

9. Discharge lamp comprising a luminescent screen as claimed in claim 7.

10. Discharge lamp according to claim 9, comprising a gastight lamp vessel containing mercury and gas.

11. Luminescent material comprising zinc silicate activated with $Mn^{2+}$, wherein the zinc silicate is doped with one or more trivalent dopant ions chosen from the group consisting of $Gd^{3+}$, $Ce^{3+}$, $Pr^{3+}$, $Nd^{3+}$, $Sm^{3+}$, $Tb^{3+}$, $Dy^{3+}$, $Ho^{3+}$, $Er^{3+}$, $Tm^{3+}$ and $Yb^{3+}$ and the zinc silicate further comprises one or more ions chosen from the group consisting of $Li^{1+}$, $Na^{1+}$ and $K^{1+}$.

12. Luminescent material according to claim 11, wherein the amount of monovalent ions is substantially equal to the amount of trivalent ions.

13. Luminescent material according to claim 11, wherein between 0.1% and 15% of the $Zn^{2+}$ ions of the zinc silicate have been replaced by the $Mn^{2+}$ ions.

14. Luminescent material according to claim 11, wherein between 0.05% and 5% of the $Zn^{2+}$ ions of the zinc silicate have been replaced by said one or more dopant ions.

15. Luminescent screen comprising a luminescent material, said material comprising zinc silicate activated with $Mn^{2+}$, wherein the zinc silicate is doped with one or more trivalent dopant ions chosen from the group consisting of $Gd^{3+}$, $Ce^{3+}$, $Pr^{3+}$, $Nd^{3+}$, $Sm^{3+}$, $Tb^{3+}$, $Dy^{3+}$, $Ho^{3+}$, $Er^{3+}$, $Tm^{3+}$ and $Yb^{3+}$ and the zinc silicate further comprises one or more ions chosen from the group consisting of $Li^{1+}$, $Na^{1+}$ and $K^{1+}$.

16. Plasma display panel comprising a luminescent screen as claimed in claim 15.

17. Discharge lamp comprising a luminescent screen as claimed in claim 15.

18. Discharge lamp according to claim 17, comprising a gastight lamp vessel containing mercury and gas.

* * * * *